United States Patent [19]

Labaziewicz

[11] Patent Number: 5,323,196
[45] Date of Patent: Jun. 21, 1994

[54] PHOTOGRAPHIC CAMERA FOR PANORAMIC SIZE EXPOSURES USING UNIDIRECTIONAL MASKING BLADES

[75] Inventor: Peter Labaziewicz, Rochester, N.Y.

[73] Assignee: Eastman Kodak Company, Rochester, N.Y.

[21] Appl. No.: 21,443

[22] Filed: Feb. 24, 1993

[51] Int. Cl.⁵ .............................................. G03B 17/02
[52] U.S. Cl. .................................................... 354/159
[58] Field of Search ........................... 354/94, 222, 159

[56] References Cited

U.S. PATENT DOCUMENTS

| | | | |
|---|---|---|---|
| 4,357,102 | 11/1982 | Taren et al. | 355/77 |
| 4,716,427 | 12/1987 | Shyu | 354/159 |
| 5,066,971 | 11/1991 | Kodaira | 354/465 |
| 5,086,311 | 2/1992 | Naka et al. | 354/195.1 |

Primary Examiner—David M. Gray
Attorney, Agent, or Firm—Roger A. Fields

[57] ABSTRACT

A photographic camera capable of taking interspersed full size and panoramic size exposures comprises a rectangular back frame opening for forming a full size exposure on a film in the camera, and respective masking blades supported for pivotal movement to a masking position for masking an upper rectangular portion and a lower rectangular portion of the back frame opening to allow only a panoramic size exposure to be formed on the film and to a non-masking position not masking the upper and lower portions to preclude a panoramic size exposure from being formed on the film. According to the invention, the masking blades have respective extension means at which they are supported for pivotal movement for moving the masking blades in only one direction from their non-masking position to their masking position and to return the masking blades in only one direction, different than the first-mentioned direction, to their non-masking position.

3 Claims, 3 Drawing Sheets

PHOTOGRAPHIC CAMERA FOR PANORAMIC SIZE EXPOSURES USING UNIDIRECTIONAL MASKING BLADES

BACKGROUND OF THE INVENTION

1. Field of the Invention

The invention relates generally to the field of photography, and in particular to a photographic camera capable of taking interspersed full size and panoramic size exposures.

2. Description of the Prior Art

U.S. Pat. No. 5,086,311, issued Feb. 4, 1992, discloses a photographic camera capable of taking interspersed full size and panoramic size exposures. Typically, a full size exposure is about 24.4 mm×36.4 mm and a panoramic size exposure might be about 13.3 mm×36.4 mm. Thus, the panoramic size exposure has a stretched-out or panorama-like appearance as compared to the full size exposure.

Looking at the '311 patent, within the camera body there is provided a (conventional) rectangular back frame opening for forming a full size exposure on a filmstrip. Also, respective masking blades are supported for pivotal movement to a masking position for masking an upper rectangular portion and a lower rectangular portion of the back frame opening to allow only a panoramic size exposure to be formed on the filmstrip and to a non-masking position not masking the upper and lower portions to preclude a panoramic size exposure from being formed on the filmstrip, i.e. to allow a full size exposure to be formed on the filmstrip.

Problem to be Solved by the Invention

In U.S. Pat. No. 5,086,311. the masking blades when moved to their masking position must individually pivot in opposite forward directions. Similarly, when moved to their non-masking position must individually pivot in opposite reverse directions. This requires a relatively complex mechanical actuating device for moving the masking blades.

SUMMARY OF THE INVENTION

According to the invention, a photographic camera capable of taking interspersed full size and panoramic size exposures comprises a rectangular back frame opening for forming a full size exposure on a film in the camera, and respective masking blades supported for pivotal movement to a masking position for masking an upper rectangular portion and a lower rectangular portion of the back frame opening to allow only a panoramic size exposure to be formed on the film and to a non-masking position not masking the upper and lower portions to preclude a panoramic size exposure from being formed on the film, and is characterized in that:

said masking blades have respective extension means at which they are supported for pivotal movement for moving the masking blades in only one direction from their non-masking position to their masking position and to return the masking blades in only one direction, different than the first-mentioned direction, to their non-masking position.

More particularly, there is provided a single-piece actuation slide which is supported for translational movement in engagement with the extension means of the masking blades to move the masking blades in only one direction to their masking position. Also, there is provided respective springs which bias the masking blades in only one direction to their non-masking position.

Since the masking blades need move in only one direction to their masking position or to their non-masking position, a mechanical arrangement which is relatively simple as compared to the mechanical arrangement in U.S. Pat. No. 5,086,311 can be realized.

DETAILED DESCRIPTION OF THE PREFERRED EMBODIMENT

The invention is disclosed as being embodied in a 35 mm still camera. Because such a photographic camera is well known, this description is directed in particular to camera elements forming part of or cooperating directly with the preferred embodiment. It is to be understood, however, that camera elements not specifically shown or described may take various forms known to persons of ordinary skill in the art.

Figure 1:
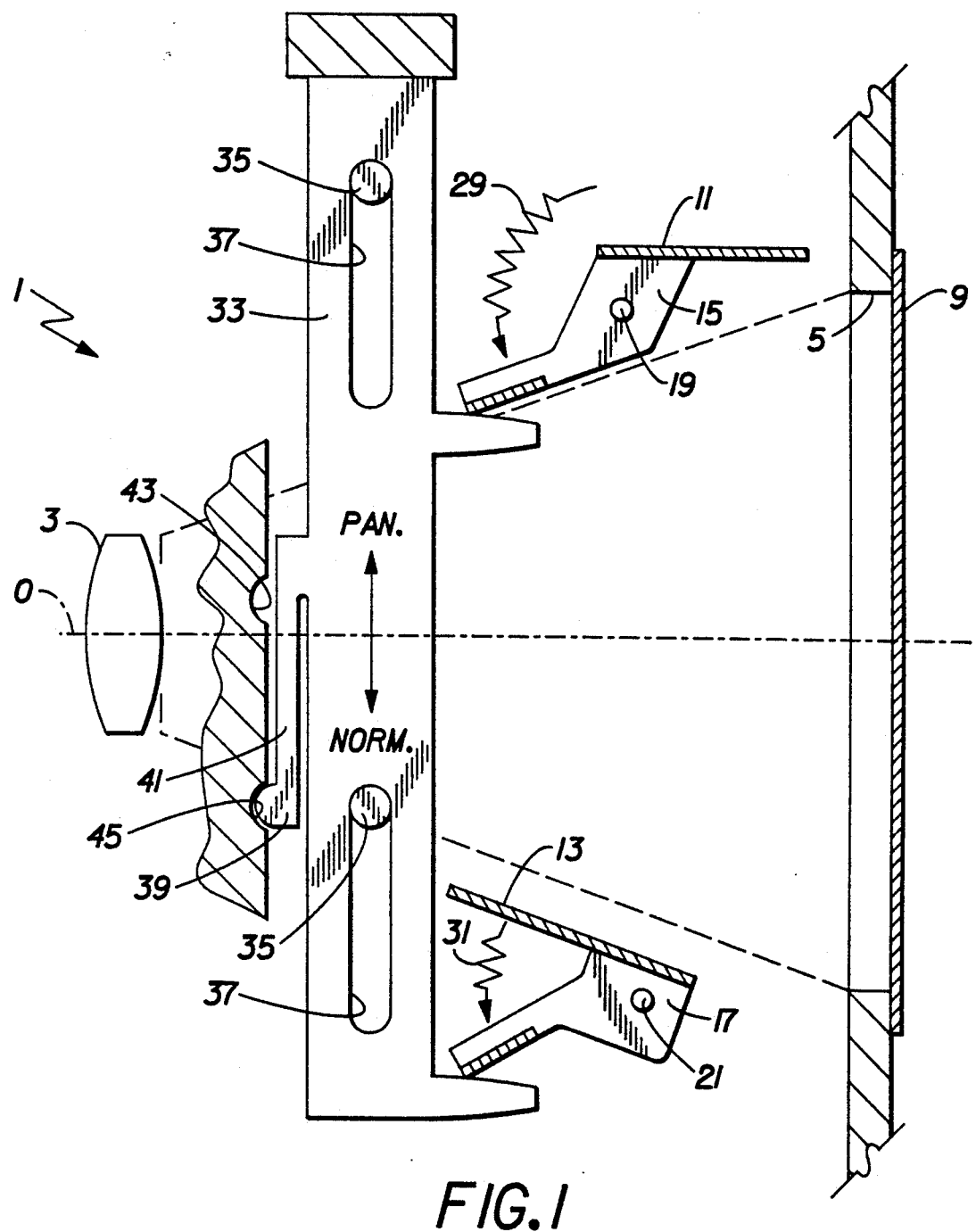
FIG. 1 is a side elevation view of an assemblage of camera elements according to a preferred embodiment of the invention, schematically illustrating a pair of masking blades in a non-masking position to allow a full size exposure to be made on a filmstrip at a back frame opening.
Figure 3:
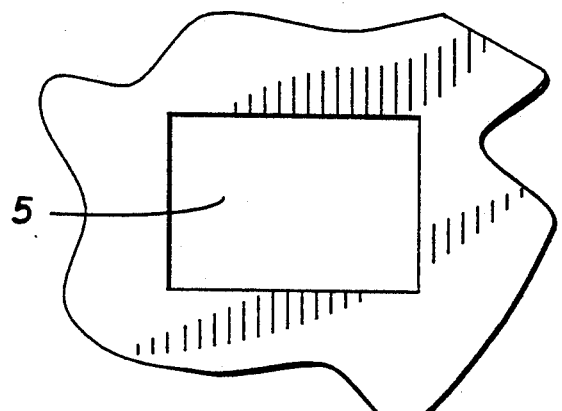
FIG. 3 is a front elevation view of the back frame opening.
Figure 5:
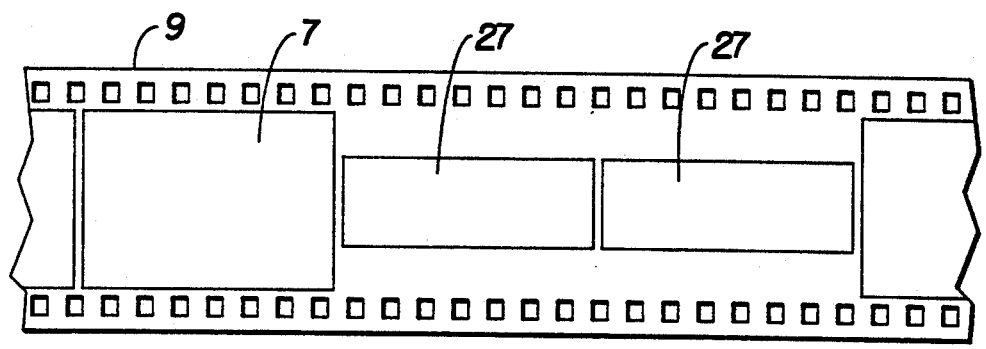
FIG. 5 is a plan view of the filmstrip with interspersed full size and panoramic size exposures.

Referring now to FIGS. 1, 3, and 5 of the drawings, a 35 mm still camera 1 has a known taking lens 3 and a back frame opening 5 which are each centered on an optical axis O of the taking lens. As is conventional, the back frame opening 5 is rectangular shaped for forming a full size (about 24.4 mm×36.4 mm) exposure 7 on a 35 mm filmstrip 9 at the back frame opening.

Figure 2:
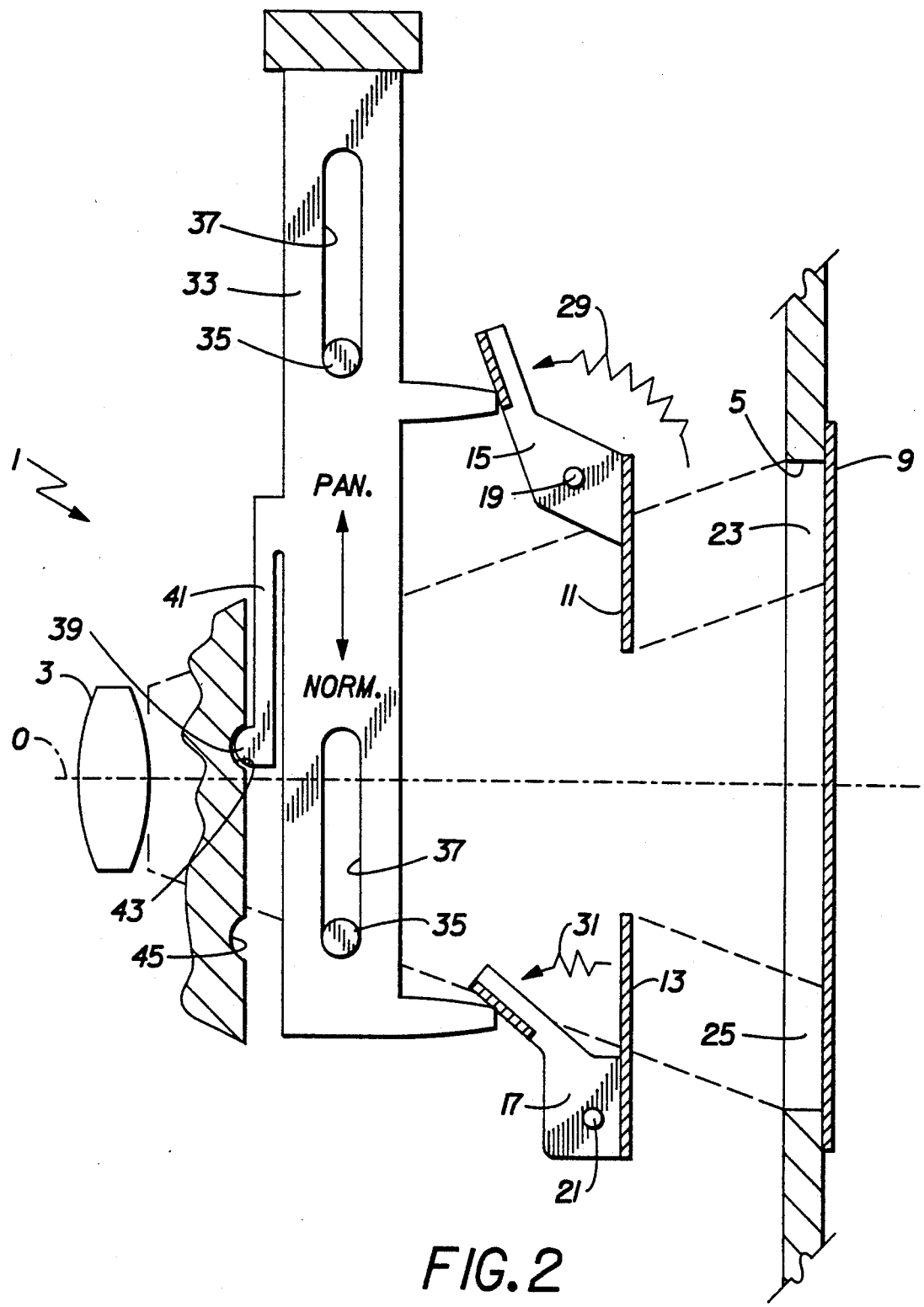
FIG. 2 is a side elevation view similar to FIG. 1, schematically illustrating the masking blades in a masking position to allow only a panoramic exposure to be made on the filmstrip at the back frame opening.
Figure 4:
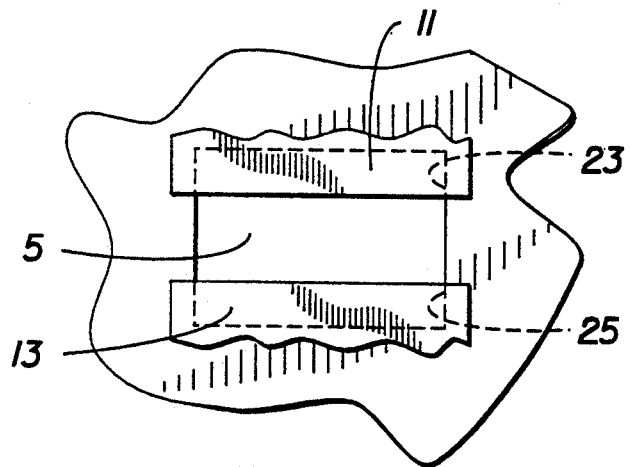
FIG. 4 is a front elevation view similar to FIG. 3, showing the back frame opening partly covered by the masking blades when the blades are in their masking position.

A pair of similar dimensioned rectangular masking blades 11 and 13 have respective extension arms 15 and 17 supported at pivot pins 19 and 21 to permit pivotal movement of the blades about the pins in only one direction from a non-masking position shown in FIG. 1 to a masking position shown in FIGS. 2 and 3 and to return the blades about the pins in only one direction, opposite to the first-mentioned direction, to their non-masking position. In the masking position, the blades 11 and 13 mask an upper rectangular portion 23 and a lower rectangular portion 25 of the back frame opening 5 to allow only a panoramic size (about 13.3 mm×36.4 mm) exposure 27 to be formed on the filmstrip 9 at the back frame opening 5..See FIGS. 4 and 5. In the non-masking position, the masking blades 11 and 13 do not mask any portion of the back frame opening 5 and, thus, allow a full size exposure 7 to be formed on the filmstrip 9 at the back frame opening. See FIGS. 3 and 5. Respective compression springs 29 and 31 bias the masking blades to their non-masking position.

A single-piece actuation slide 33 is supported via a pair of pin 35 and slot 37 couplings for translational movement in engagement with the extension arms 15 and 17 of the masking blades 11 and 13 to move the blades in only one direction from their non-masking position to their masking position. See FIGS. 1 and 2. A pawl 39 at a free end of a flexible finger 41 of the slide 33 is shaped to alternatively fall into each of separate fixed cavities 43 and 45 to releasably hold the slide as shown in FIGS. 1 and 2.

The invention has been described with reference to a preferred embodiment. However, it will be appreciated that variations and modifications can be effected within the ordinary skill in the art without departing from the scope of the invention.

I claim:

1. A photographic camera capable of taking interspersed full size and panoramic size exposures comprises a rectangular back frame opening for forming a full size exposure on a film in said camera, and respective masking blades supported for pivotal movement to a masking position for masking an upper rectangular portion and a lower rectangular portion of said back frame opening to allow only a panoramic size exposure to be formed on the film and to a non-masking position not masking said upper and lower portions to preclude a panoramic size exposure from being formed on the film, and is characterized in that:

said masking blades have respective extension means at which they are supported for pivotal movement for moving the masking blades in only one turning direction from their non-masking position to their masking position and to return the masking blades in only one turning direction, different than the first-mentioned turning direction, to their non-masking position.

2. A photographic camera as recited in claim 1, wherein a single-piece actuation slide is supported for translational movement in engagement with said extension means of the masking blades to move said masking blades in only one turning direction to their masking position.

3. A photographic camera as recited in claim 2, wherein respective springs bias said masking blades in only one turning direction to their non-masking position.

* * * * *